Figure 1:
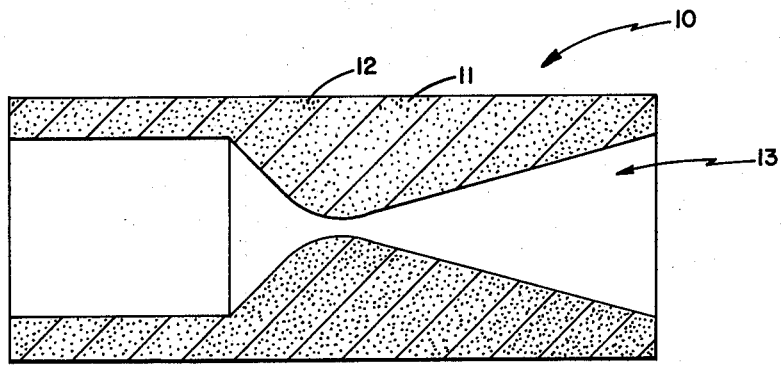

Aug. 25, 1964 S. R. MALOOF 3,145,529
REFRACTORY COMPOSITE ROCKET NOZZLE AND METHOD OF MAKING SAME
Filed March 10, 1960

SAMUEL R. MALOOF
INVENTOR.

BY Alden D Redfield
ATTORNEYS

United States Patent Office 3,145,529
Patented Aug. 25, 1964

3,145,529
REFRACTORY COMPOSITE ROCKET NOZZLE
AND METHOD OF MAKING SAME
Samuel R. Maloof, Belmont, Mass., assignor to
Avco Corporation, Cincinnati, Ohio, a corporation
of Delaware
Filed Mar. 10, 1960, Ser. No. 13,989
11 Claims. (Cl. 60—35.6)

This invention relates to means for directing the flow of high temperature fluids and method of making the aforementioned means. More particularly this invention relates to fluid directing means used in rocket propulsion.

Thrust in rocket motors is generated by converting the enthalpy in the propellent gas—gas generated by burning a fuel—to kinetic energy in a sonic or supersonic nozzle. The temperatures and pressures found in the propellent gas, and imparted to the nozzle are extremely high. In the present state of the art, temperatures of 2600° C. and 1000 p.s.i.g. (pounds per square inch gauge) are very common and the trend is upward.

An important consideration in rocket nozzle design is the selection of a material that can operate reliably in the aforementioned environment. Designers have turned to refractory metals, such as tungsten, molybdenum and tantalum, to name a few, since these metals show the most promise. In particular, designers have turned to tungsten because it has the highest melting point of all the refractory metals. In addition, tungsten has excellent resistance to the chemical corrosion of the hot gases. Furthermore, it resists abrasive erosion and has excellent high temperature strength. By way of illustration but not of limitation reference will be made to the use of tungsten in rocket nozzles. However, it will be understood that the processes described herein may be applied to other refractory metals if desired.

Serious limitations have been encountered in adapting tungsten to rocket nozzles. As is well known, tungsten devices are not good thermal conductors, since they are almost always formed from pressed and sintered powder and are not fully dense. When the propellent gas passes over the inside walls of a nozzle, the heat flux is not easily conducted through the walls and a large temperature gradient is set up in the walls of the nozzle. In fact, the temperature difference between the inside and outside surfaces may be several thousand degrees centigrade during the first few seconds of heating giving rise to a heat shock. Tungsten nozzles have proved to be unreliable in this environment due to an unpredictable tendency of the tungsten to crack when subjected to heat shock.

Another important consideration in rocketry is the need to reduce the weight of the vehicle to a minimum to make the most effective use of the energy stored in a propellant. Tungsten, when compared to the other metals, has an extremely high density, but tungsten nozzles, in the past, have been extremely heavy, more so than had been anticipated. The tendency of tungsten to fracture when subjected to heat shock dictates an increase in wall thicknesses many times beyond the extent required for structural requirements. The added mass acts as a heat sink for absorbing the heat flux transferred to the rocket nozzle to lower the back wall temperature.

A third limitation on the use of pure tungsten, is its incompatibility with graphite. In conventional practice, a rocket nozzle is supported by a graphite back-up structure. The back-up structure is provided for mechanical reinforcement and added heat capacity, making it possible to use a minimum of the extremely heavy refractory metal. At elevated temperatures, substantially below the temperatures found in the propellent gases, the tungsten will chemically combine with the graphite to form brittle carbides, the melting point of which is substantially lower than the melting point of either the graphite or the tungsten. These brittle carbides tend to migrate away from the interface between the graphite and the tungsten and eventually leave the tungsten unsupported. Graphite, from a weight and temperature consideration, has been found to be best suited for a back-up structure and is widely used. Accordingly, the incompatibility of tungsten with graphite is a definite and material limitation on the use of tungsten for rocket nozzles.

To date, rocket nozzles made from substantially pure refractory materials must operate at temperatures substantially below the melting point of the material. It will be appreciated that as the temperature of the propellent gases approaches the melting point of the nozzle material, the latter loses strength and erosion of the nozzle walls, by the propellent gases, commences. Failure of the nozzle soon follows.

Additionally, tungsten, as is well known, is a very difficult material to machine. This further adds to the limitations of tungsten as a rocket nozzle material.

It is an object of the invention to provide a rocket nozzle material which avoids the limitations and disadvantages of prior art materials of this type.

It is another object of the invention to provide a process for making a superior rocket nozzle material.

It is still another object of the invention to provide a rocket nozzle comprising a refractory composite material.

It is still another object of the invention to provide a rocket nozzle made from a porous high temperature material that has been impregnated with a more fusible material.

Other objects of the invention are to provide a refractory rocket nozzle material which:

(1) Comprises a porous refractory metal impregnated with a more fusible metal.
(2) Has excellent resistance to chemical corrosion, thermal shock and damage by abrasive particles.
(3) Does not erode when used in conjunction with propellent gases under high pressure.
(4) Is operable in temperature environments exceeding the melting point of the materials used in its construction.
(5) Is usable in thin-walled construction and does not fracture when subjected to heat shock.
(6) Is compatible with carbonaceous materials.
(7) Is easily machined.
(8) Has good high temperature strength.
(9) Develops a protective fluid barrier to the hot gases on the nozzle surfaces, and
(10) Prevents build-up of solids, found in propellent gases on the walls of the nozzle.

It is a further object of the invention to provide a process for making refractory composite materials for rocket nozzles.

In accordance with the invention my novel rocket nozzle comprises a porous refractory material which has been impregnated with a fusible material which vaporizes at a temperature slightly below the utilization temperature of the refractory material and does not alloy with the refractory material. Preferably the refractory material is tungsten and the fusible material copper, although other impregnating materials such as silver and gold may be used. A minute amount of nickel or chromium may be added to the impregnant to increase the mechanical strength of the composite.

Also in accordance with the invention a process of making a refractory composite material for rocket nozzles comprises pressing and sintering powdered refractory metal to a porous blank; impregnating the sintered blank with a more fusible material, and dimensionally shaping the blank.

Figure 2:
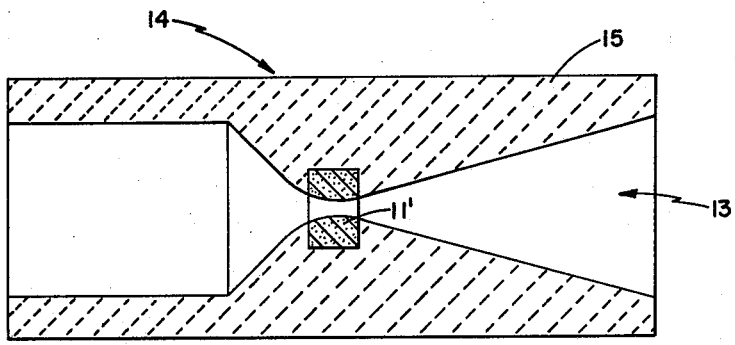

The novel features that are considered characteristic of the invention are set forth in the appended claims; the invention itself, however, both as to its organization and method of operation, together with additional objects and advantages thereof, will best be understood from the following description of a specific embodiment taken together with the drawings where:

FIGURE 1 is a sectional view of a rocket nozzle formed from a composite material embodying the concepts of the invention, and FIGURE 2 is a sectional view of a rocket nozzle having inserts in the critical throat area formed from a composite material embodying the concepts of the invention.

Several definitions, at this time, will facilitate understanding the discussion that follows.

The term "utilization temperature" will be used herein. It denotes the highest temperature at which a refractory material will function to direct the flow of high temperature fuel. Above this temperature the material fails because of a loss in structural integrity brought about by a loss of strength, softening, at elevated temperatures. Generally, the utilization temperature is below the melting point of a material and it will differ for different materials.

A "composite material" is defined as a material containing an admixture of two or more constituents, one of which is a refractory material, which may be mechanically bonded. There is little or no chemical bond, such as alloying of two metal constituents. A "fusible material," as used herein, refers to a material having a vaporizing temperature slightly less than the utilization temperature of the refractory material.

A composite for superior rocket nozzles comprises a highly dense pressed and sintered porous mass which is impregnated with a more fusible metal. The composite preferably should comprise substantially 70–90% by weight tungsten. The combined action of the tungsten and the impregnant extends the life, reliability, and capabilities of the tungsten into areas in which tungsten alone cannot be used.

The preferred impregnant should have excellent heat conductivity, and machine easily. It should melt below the preferred sintering temperatures of tungsten, but boil, or evaporate, at temperatures slightly below the utilization temperature of tungsten. The preferred impregnant should not alloy with the refractory material. As will be seen hereinafter, each of these properties are used to avoid the aforementioned disadvantages and limitations of tungsten as a rocket nozzle material. Referring to FIGURE 1, there is depicted a rocket nozzle generally designated 10. The rocket nozzle 10 comprises a unitary wall structure formed from a composite material 11 comprising a refractory material preferably tungsten and an impregnant 12.

The tungsten is preferably fabricated as a porous mass by any convenient method such as pressing and sintering. It may be prepared in the form of a blank and subsequently machined to shape or formed and shaped in one operation.

The porous refractory mass is impregnated with an impregnant 12 in the manner discussed hereafter. The numeral 13 denotes a conventional rocket nozzle passage.

The preferred impregnant is copper although silver and gold may be used. Tungsten does not soften appreciably until 2750° C., its utilization temperature. For rocket nozzles sintering close to 2000° C. is recommended. Copper melts at 1083° C. but boils at 2600° C.

Briefly, the impregnant infiltrates the porous mass through the intergranular voids found in pressed and sintered tungsten forms. The impregnant, in effect, surrounds the tungsten granules forming a fully dense composite material. As is well known, the suggested impregnants do not alloy with tungsten. They do, however, add to the mechanical strength of the tungsten mass through the many adhesive bonds created between the impregnant and the tungsten. As will be shown hereinafter, a minute quantity of an alloying metal may be used to strengthen the bond between the impregnant and the tungsten.

The heat conductivity of the composite greatly exceeds that of the pressed and sintered tungsten for two reasons. It is obvious that the fully dense composite offers less resistance to the transfer of heat than a porous mass. In addition, copper, silver and gold, the suggested impregnants are excellent conductors of heat and when one is used as an impregnant, it creates a low resistance path for heat flux through the walls of the rocket nozzle. A substantially lower temperature gradient in the wall results.

The composite material can be made substantially more machinable than pressed and sintered tungsten. The composite no longer machines like tungsten; its machinability is determined by the impregnant. Where a copper impregnant is used, machining the composite becomes a simple procedure.

The additional quantities of heat required to transform the impregnant to a vapor adds to the heat absorbing capacity of a composite refractory rocket nozzle. More specifically, reference is made to the heat of fusion and vaporization of impregnants that have a liquid phase and the heat of vaporization of impregnants that sublime.

The vapor leaves the composite through the intergranular passages and enters the propellent gas stream. Since the propellent gas flows in a directed stream through the rocket nozzle, the evaporating impregnant is formed into a protective film adjacent to the nozzle surface between the propellent gas and the nozzle. The protective film cools the rocket nozzle surface thus enabling the surface to operate at temperatures far in excess of the melting point of the tungsten material. The evaporating impregnant also prevents the propellent gases from infiltrating into the porous tungsten thus preventing erosion of the wall. The film between the nozzle wall and the propellent gas further protects the composite material from corrosion by the hot propellent gases.

As the temperature of the outside surface of the rocket nozzle rises to the vaporization temperature of the impregnant, the impregnant evaporates out of the composite from this surface. Assuming a conventional construction, namely the composite nozzle mounted on a graphite back-up structure, the evaporating impregnant flows through the interface of the composite and the graphite back-up structure preventing a chemical reaction between the graphite and the tungsten. In this way it can be said that the composite is compatible with graphite or carbonaceous materials.

Since the cooling action of the impregnant prevents the tungsten component of the composite material from reaching its utilization temperature, the mechanical strength of the nozzle remains very high, and its dimensions relatively undisturbed.

In rocket nozzles operating with solid propellants at low p.s.i.g., it has been observed that solid residue in the propellent tends to adhere to the wall of a rocket nozzle. After a short time, there is a sufficient build-up of these particles to reduce the nozzle aperture and cause an excessive increase in the propellent gas pressure. A catastrophic failure of the motor often results. An additional benefit derived from the impregnant film is the prevention of any substantial build-up of a propellent residue.

*Description of Processes for Making a Tungsten Composite Rocket Nozzle*

Typically, tungsten and other refractory metal shapes are usually formed from their powders. Accordingly, one preferred method of producing a tungsten composite rocket nozzle comprises placing tungsten powder, having a particle size of approximately 5–10 microns in a form or mold, preferably to form a sleeve blank. The powder is then compacted under high pressure, twenty tons per square inch for example, by any suitable mechanical or hydraulic means. A fragile porous blank is produced. Following the compression step, the powder is sintered in a hydrogen, inert, or an evacuated atmosphere to mechanically bond the weak porous mass into a more coherent form which has sufficient mechanical strength so that it may be handled for further treatment. For rocket nozzle applications, it is preferable to sinter tungsten at close to 2000° C. or slightly higher. A temperature range of 1800–2200° C. is preferred. The density of the tungsten after this sintering operation lies between 70 to 80% of theoretical density (19.3 gms./cu. cm.).

Following the sintering operation the porous blank is impregnated by imparting to the exposed surfaces of the blank a molten impregnant. The blank and impregnant are maintained above the melting point of the impregnant to assure maximum penetration of the impregnant into the blank. The impregnant is drawn into the blank by means of capillary action.

Impregnation of the porous blank can also be accomplished by wrapping foil or wire fabricated from a desired impregnant around the exposed surfaces of the porous blank and raising the temperature of the assembly above the melting point of the impregnant.

Following impregnation, the impregnated blank is cooled in any suitable manner forming a refractory composite blank, which is then dimensionally shaped into a rocket nozzle by any suitable machining operation.

It is preferable to impregnate at temperatures several hundred degrees above the melting point of the impregnant to take advantage of the fact that its viscosity, normally decreases as the temperature is raised. Simpler and more thorough impregnation results. If the impregnant is copper, the preferred impregnating procedure is to melt the copper at 1300° C. and start impregnating the porous blank. Impregnation is then continued and completed at 1400–1500° C.

It may be necessary, where the blanks have thick walls, to interrupt the machining of the blank to repeat the impregnation step one or more times. Impregnation during machining will assure adequate penetration of the walls of the rocket nozzle, when formed. To further facilitate impregnation, a pressure difference can be established and maintained between the impregnant and the cavities within the tungsten blank.

In the event it is desired to increase the strength in a composite material, a small amount of the alloying material is added to the more fusible metal. Common alloying metals are chromium, iron and nickel, the latter being preferred. Whereas it is desirable that the more fusible metal and tungsten be insoluble to avoid the development of low melting point alloys, a small quantity of the alloying metal acts as a wetting agent for the more fusible metal and strengthens the bond between the tungsten and the more fusible metal. The addition of 1% nickel to copper was also found to be highly beneficial because nickel is slightly soluble in both tungsten and copper, and a chemical bond is created between the copper and the tungsten. The addition of nickel is not inconsistent with the requirement that the impregnant be insoluble in tungsten. The nickel is used in minute quantities and is only slightly soluble in tungsten and copper.

The composite formed in practicing the process outlined above yields a composite which contains 70–90% tungsten by weight.

An alternate method of fabricating a composite refractory rocket nozzle comprises mixing finely divided tungsten and an impregnant in the proportion of 70–90% tungsten and 30–10% impregnant by weight, respectively. If an alloying metal is used, it is considered to be part of the impregnant. The mixture is thoroughly mixed in a ball mill, for example, to assure uniform distribution of the copper throughout. The mixture is then pressed and sintered in a temperature range of 1400–1500° C. to form a composite blank, preferably a sleeve. The blank, after it has been cooled, may be machined in any suitable manner.

The alternative method described above will yield a suitable but less efficient nozzle than a nozzle manufactured in conformance with the first process outlined. The principal advantage of the first process is to provide a nozzle having more uniform distribution of the more fusible material.

The aforementioned processes may also be used to fabricate selected sections, such as the throat section of rocket nozzles. The materials used in fabricating rocket nozzles are determined primarily by the temperature of the combustion products and their abrasiveness. In liquid fuel rocket engines, in particular, rocket nozzles are often fabricated by using a relatively light refractory material such as graphite and providing in the area of the throat of the rocket nozzle a more durable material to withstand the high temperatures and pressures that are generated in the throat. FIGURE 2 depicts a rocket nozzle 14 comprising a body 15 formed on some suitable refractory material such as graphite. A composite insert 11[1] constructed in accordance with the concepts of this invention is provided in the throat of the rocket nozzle 14 because of its ability to withstand the extreme temperatures and pressures generated therein.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

I claim:
1. A process for making a refractory composite rocket nozzle material comprising the steps of: pressing and sintering a refractory material into a predetermined porous nozzle shape; and impregnating the porous shape with a more fusible and substantially nonalloying material having a vaporization temperature slightly below the utilization temperature of the refractory material.

2. A process for making a refractory composite rocket nozzle comprising the steps of: pressing and sintering a refractory material into a porous blank having a predetermined shape; impregnating the porous blank with a more fusible and substantially nonalloying material having a vaporization temperature slightly below the utilization temperature of the refractory material; and dimensionally machining the blank into a rocket nozzle.

3. A process as described in claim 2 in which said refractory material is tungsten and said impregnant comprises a material which does not alloy with tungsten.

4. A process for making a refractory composite rocket nozzle as described in claim 2 in which the impregnant is copper.

5. A process for making a tungsten composite rocket nozzle comprising the steps of: pressing and sintering powdered tungsten into a predetermined porous nozzle shape; and impregnating the porous shape with an impregnant comprising a more fusible metal having a vaporizing temperature slightly below the utilization temperature of the tungsten, said impregnant comprising copper in combination with an alloying metal.

6. A process as described in claim 5 in which the impregnant includes approximately 1% nickel by weight as the alloying metal.

7. A process for making a tungsten composite rocket nozzle comprising the steps of: thoroughly mixing powdered tungsten and a more fusible material having a vaporizing temperature slightly below the utilization temperature of tungsten in proportion to 70–90% tungsten and 30–10% fusible material by weight respectively; pressing and sintering the aforementioned mixture into a rocket nozzle shape.

8. A process for making a tungsten composite rocket nozzle comprising the steps of: compressing a tungsten powder, comprising 5–10 micron tungsten powder into a porous blank; sintering the porous blank at a temperature of 1800–2200° C. until the blank is strong enough to be handled for further treatment; impregnating the blank with copper at 1200–1300° C. to form a tungsten composite; raising the temperature of the tungsten composite to 1400–1500° C. to lower the viscosity of the copper to facilitate its penetration into the porous blank; and cooling and dimensionally machining the composite blank into a rocket nozzle.

9. A rocket nozzle comprising: a dimensionally shaped peripheral wall formed from a refractory composite material comprising pressed and sintered porous tungsten which has been impregnated with copper in the proportion of 70–90% tungsten and 30–10% copper by weight, respectively.

10. A rocket nozzle comprising: a dimensionally shaped peripheral wall formed from a refractory composite material comprising pressed and sintered tungsten impregnated with an impregnant, said impregnant comprising 99% copper and 1% nickel by weight, said composite comprising 70–90% tungsten and 30–10% impregnant by weight, respectively.

11. A process for making a refractory composite rocket nozzle comprising the steps of: fabricating a refractory material into a high density porous blank; impregnating the blank with a more fusible and substantially nonalloying material having a vaporization temperature slightly below the utilization temperature of the refractory material; and, dimensionally shaping the blank into a rocket nozzle.

References Cited in the file of this patent

UNITED STATES PATENTS

| | | |
|---|---|---|
| 2,131,994 | Hensel | Oct. 4, 1938 |
| 2,354,151 | Skoglund | July 18, 1944 |
| 2,581,252 | Goetzel et al. | Jan. 1, 1952 |
| 2,614,947 | Heyroth | Oct. 21, 1952 |
| 2,849,860 | Lowe | Sept. 2, 1958 |
| 2,851,381 | Hoyer | Sept. 9, 1958 |
| 2,946,680 | Raymont | July 26, 1960 |
| 3,014,353 | Scully et al. | Dec. 26, 1961 |
| 3,022,190 | Feldman | Feb. 20, 1962 |
| 3,026,806 | Runton et al. | Mar. 27, 1962 |

FOREIGN PATENTS

| | | |
|---|---|---|
| 148,533 | Great Britain | Sept. 8, 1921 |
| 691,953 | Great Britain | May 27, 1953 |
| 751,649 | Great Britain | July 4, 1956 |
| 1,108,090 | France | Aug. 17, 1955 |